United States Patent [19]
Allen

[11] 3,827,324
[45] Aug. 6, 1974

[54] CROWDER ROLL ARM FOR BANDMILL

[75] Inventor: Francis Edwin Allen, North Vancouver, British Columbia, Canada

[73] Assignee: Letson and Burpee Ltd., Vancouver, British Columbia, Canada

[22] Filed: June 16, 1972

[21] Appl. No.: 263,437

[52] U.S. Cl.............. 83/425.2, 83/436, 83/808, 83/820, 144/246 R
[51] Int. Cl............. B27b 15/08, B27b 25/02
[58] Field of Search ............ 83/788, 790, 809, 813, 83/420, 436, 425, 425.2, 789, 802, 431, 432, 820, 155.1; 144/246 R, 246 B, 246 A

[56] References Cited
UNITED STATES PATENTS

| | | | |
|---|---|---|---|
| 767,397 | 8/1904 | Fairfield | 83/425.2 |
| 812,987 | 2/1906 | Garland | 83/425.2 |
| 2,169,394 | 8/1939 | Richardson | 144/246 |

Primary Examiner—Donald R. Schran
Attorney, Agent, or Firm—Brian J. Wood

[57] ABSTRACT

Crowder roll assembly for use with infeed conveyor and fixed line bar of setting bandmill. To change sawn cant width, bandmill sets to line bar which remains stationary. Bandmill cuts cant fed through saw, sawn datum face of cant being pressed against line bar by crowder roll to maintain axial feed parallel to line bar. Contact strip between roll and cant is longitudinally separated from saw by overhang length. Roll is journalled on arm hinged at one end to permit rotation of arm to accommodate cants of different widths. Hinge axis positioned relative to line bar so that overhang length for cant of minimum width is less than overhang length for cant of maximum width providing improved support to reduce chatter when cutting narrow cants.

10 Claims, 6 Drawing Figures

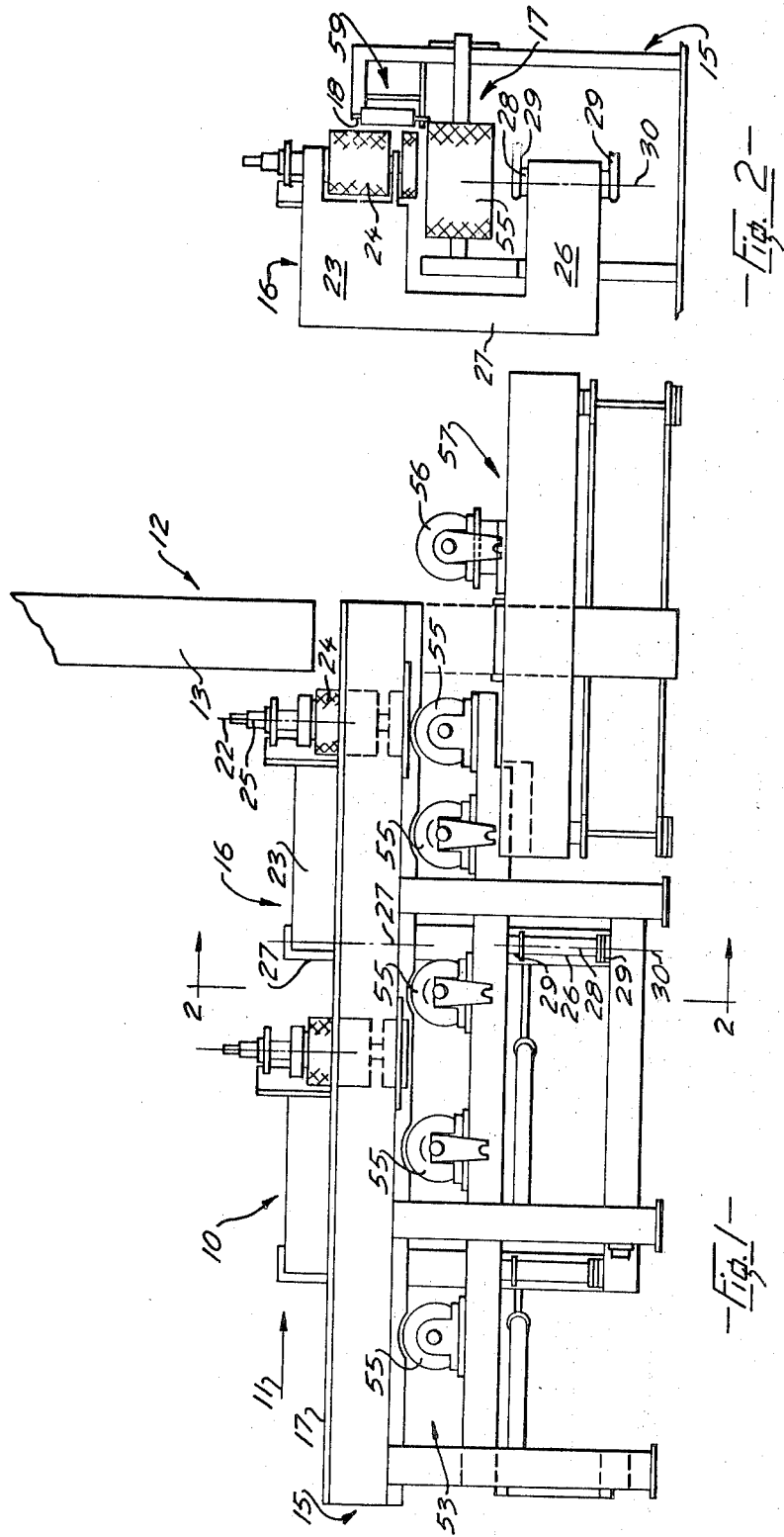

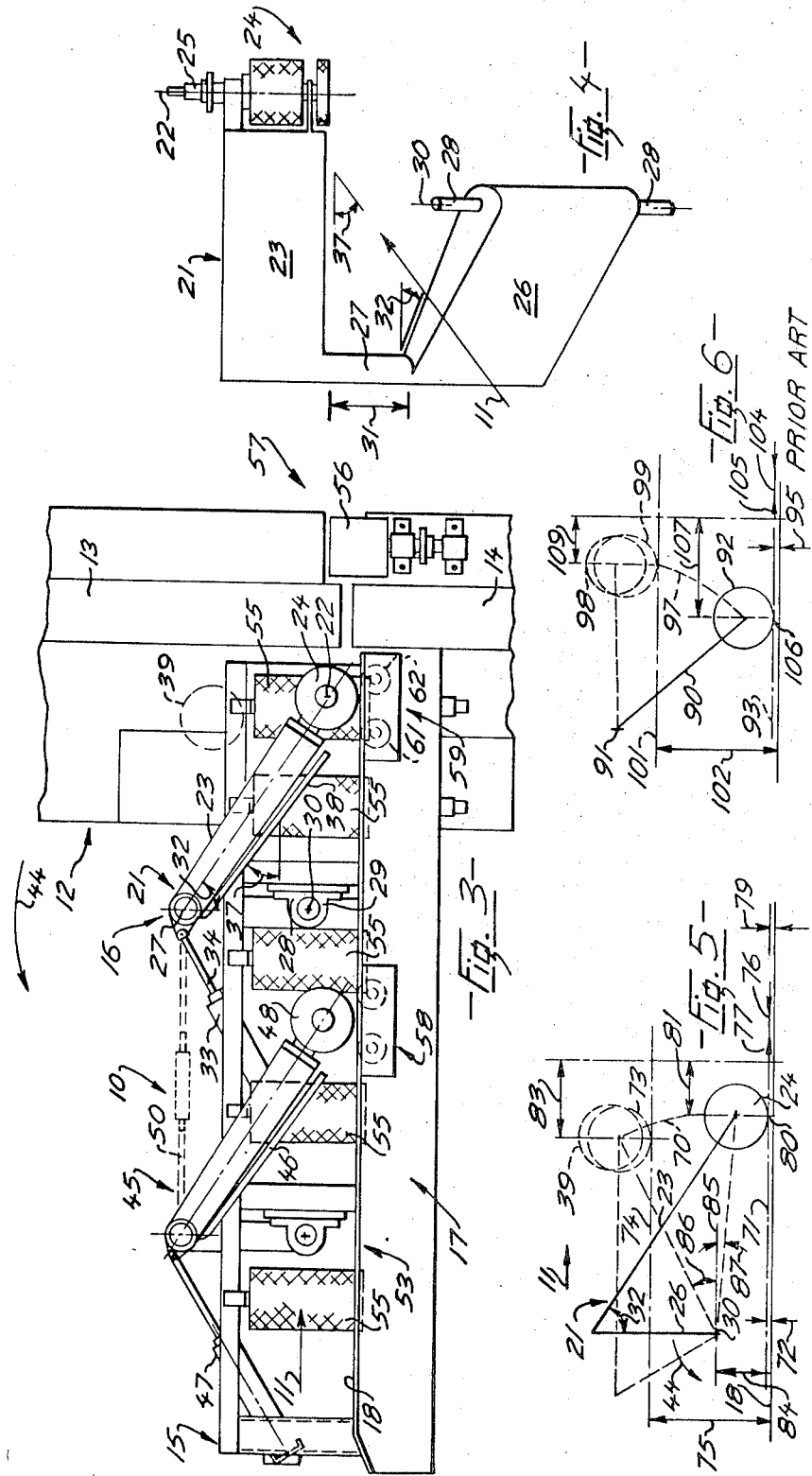

CROWDER ROLL ARM FOR BANDMILL

BACKGROUND OF THE INVENTION

1. Field of the Invention

The invention relates to bandmills as used in the lumber industry, in particular to a crowder roll arm used with a fixed line bar of a bandmill.

2. Prior Art

A bandmill has a pair of vertically spaced, coplanar wheels carrying an endless saw, which saw is adapted to cut lumber moving through a cutting portion of the saw, hereinafter saw cutting plane. Hereinafter the term "cant" refers to sawn lumber having at least one face sawn parallel to a longitudinal axis to serve as a datum face. For re-sawing, the cant is fed longitudinally along conveyors and through the saw so that a leading end approaches the saw first and a trailing end is sawn last. Before re-sawing an average horizontal dimension measured normally to a longitudinal axis of the cant is referred to as unsawn cant width, and after sawing such a dimension is referred to as sawn cant width.

Commonly when a cant is fed through a bandmill, the cant is forced against a working face of a line bar spaced from the saw cutting plane on an infeed conveyor, the working face serving as a datum face for cants being sawn. Ignoring kerf loss, the spacing between the saw plane and the working face of the line bar determines the sawn cant width. Powered rotating crowder rolls on swinging arms force cants against the working face and feed the cant through the saw, the line bar ensuring axial feed and maintaining a cut parallel with the line bar, position of rolls being dependent on unsawn cant width and line bar position.

Commonly, to change sawn cant width, the line bar is moved transversely relative to the saw cutting plane, altering the spacing between the saw and the line bar. The line bar is maintained within a plane parallel to the saw cutting plane by mounting the line bar on a four bar mechanism, controlled by pneumatic jacks and adapted to swing so as to maintain the working face parallel to the saw cutting plane. Such a line bar is a relatively light structure which, when subject to vibration and loads arising from the crowder rolls, wears at bearings and original accuracy of movement and rigidity is lost after much use. Vibration above is particularly heavy when handling slabs or cants with unsawn faces in contact with crowder rolls, unevenness of the faces producing hammering on the line bar arising from crowder roll forces. Such vibration aggravates wear, and alignment accuracy of the line bar is reduced, producing inaccurate cuts with corresponding loss in yield from cants.

Commonly the crowder rolls are journalled on arms which swing on vertical columns to accommodate changes in unsawn cant width, the columns being spaced from the line bar a distance greater than maximum unsawn cant width. From the minimum unsawn cant width to the maximum, the crowder roll swings through an arc centered on the column. The crowder roll contacts a vertical contact strip on a side face of the cant remote from the line bar, such strip being spaced rearwards longitudinally from the saw an unsupported distance termed overhang length. For a wide cant the overhang length is small and, as the cant has inherent stiffness due to its width, with a wide cant cut quality is acceptable. With a narrow cant, the arm swings further rearwards than for a wider cant and thus the contact strip moves further rearwards, increasing by two or three fold the overhang length. This increase in overhang length, compounded with an inherently more flexible cant, increases deflection with a corresponding drop in cut quality.

In common twin bandmills, to vary sawn cant width, one bandmill is moved relative to the other bandmill and/or the line bar. Hereinafter when one bandmill moves relative to another bandmill or a line bar to alter sawn cant width, such a bandmill is referred to as a "setting bandmill."

SUMMARY OF THE INVENTION

The invention reduces difficulties relating to excessive overhang length of narrow cants and to loss of accuracy due to non-rigid line bars by providing a crowder roll arm according to the invention which is used in combination with a fixed, precision aligned line bar and a setting bandmill. Means of setting the bandmill is immaterial to the invention provided the mill can be set to a repeatable accuracy.

A crowder roll assembly according to the invention is for use with an infeed conveyor and fixed line bar of a bandmill, the bandmill being adapted to cut cants fed longitudinally on the conveyor. The saw of the bandmill cuts in a saw cutting plane spaced from and parallel to a working face of the line bar. The crowder roll assembly has a roll at one end to contact the cant to force it against the line bar, and is hinged at an opposite end in such a position relative to the line bar that overhang length for a cant of minimum width is less than overhang length for a cant of maximum width. In one embodiment of the invention a crowder roll arm is hinged with a hinge axis in a plane parallel to the working face of the line bar, the hinge axis passing through a point on the infeed conveyor spaced a distance from the working face of the line bar approximately one half of maximum cant width.

A detailed description following, related to drawings, gives exemplification of apparatus according to the invention which, however, is capable of expression in structure other than that particularly described and illustrated.

DESCRIPTION OF THE DRAWINGS

FIG. 1 is a fragmented side elevation of an infeed conveyor equipped with a pair of crowder roll arms according to the invention and a fixed line bar, a portion of a twin bandmill being shown, FIG. 2 is a simplified fragmented section on 2–2 of FIG. 1, some portions not shown in section, FIG. 3 is a top plan of the infeed conveyor and crowder roll arms as shown in FIG. 1, FIG. 4 is a perspective of one crowder roll arm, FIG. 5 is a top plan diagram showing extreme positions of the crowder roll arm according to the invention, FIG. 6 is a top plan diagram showing extreme positions of prior art crowder roll arms.

DETAILED DISCLOSURE

FIGS. 1 through 4

An infeed conveyor 10 feeds lumber in a direction of an arrow 11 into a twin bandmill, portions of which are designated 12. Each bandmill has an endless saw running on a pair of spaced coplanar wheels, each saw being adapted to cut a cant when the cant is fed through a saw cutting plane. The twin bandmill has a first bandmill upper wheel 13 and a second bandmill upper wheel 14, both wheels shown fragmented in FIG. 3. The bandmills can be set independently to vary sawn cant widths. The conveyor has a frame 15 supporting a crowder roll pair assembly 16, which assembly forces a sawn datum face of a cant (not shown) against a working face 18 of a fixed line bar 17. The working face 18 of the line bar is rigid, vertical and optically aligned by known precision methods to be in a plane parallel to the saw cutting plane. The face 18 provides an accurate datum face from which to set the bandmills to produce accurate widths of sawn cant, spacing of the face 18 from the saw cutting plane determining sawn cant width, (see FIG. 5). When the datum face of the cant is held against the working face 18 the cant feeds accurately through the saw as rigidity of the line bar essentially maintains axial feed with negligible transverse movement of the cant due to vibration from the crowder rolls. The conveyor is shown in use with a twin bandmill — clearly a single mill or a quad mill can be substituted.

The assembly 16 has a crowder roll arm 21 (best seen in FIG. 4), hinged for swinging relative to the conveyor 10. The arm 21 has upper and lower portions 23 and 26, both portions having inner and outer ends. The outer end of the portion 23 has a knurled roll pair 24, journalled for rotation about a central axis 22 and powered by a motor 25, the inner end of the upper portion 23 being secured to a vertical column 27. The inner end of the lower portion 26 is secured to the column 27 and spaced downwards from the upper portion 23 a vertical distance 31 to provide clearance for cants of maximum depth on the conveyor. The outer end of the lower portion 26 is hinged on aligned vertical pins 28 carried in brackets 29, the hinge having an axis 30. Thus the arm 21 has at one end a knurled roll pair 24 adapted to contact the cant and force the sawn datum face of the cant against the line bar, and is hinged at the opposite end so as to permit rotation of the arm about the axis 30. The axis 30 is vertical and is thus in a plane parallel to the working face of the line bar which is normal to an upper face of the conveyor. The axis 30 thus passes normally through the infeed conveyor at a position later particularised, so that when the arm swings about the hinge axis an arc described by the roll is in a plane parallel to the upper face of the conveyor. The upper and lower portions are coplanar with undesignated first and second vertical planes intersecting at the column 27, the planes being inclined at an acute angle 32, being about 60°.

With reference to FIG. 3 only, a pneumatic cylinder 33 has a ram 34 hinged to the column 27, an opposite end of the cylinder being hinged to a portion of the frame 15. The arm 21 has a trigger plate 38 mounted on a leading face of the portion 23 and adapted to be contacted by the leading end of a cant, which, travelling in the direction of the arrow 11, contacts the plate at an acute angle 37. When there is no cant between the roll and line bar, the arm is in a closed position in which the roll is adjacent the line bar as shown, the arm being thus primed and ready for a cant. In such a position a cant moving on the conveyor passes through the second vertical plane containing the lower portion 26 before passing through the first vertical plane containing the upper portion 23.

When a leading edge of a cant contacts the plate 38, force from the cant is at the angle 37, about thirty degrees, and thus the cant contacts the plate obliquely, tending to deflect the plate relatively gently. When the plate 38 is contacted, a limit switch (not shown) is activated and, by known electrical and pneumatic circuit means and the cylinder 33, the arm 21 rotates about the axis 30 and swings as shown by an arrow 44. The roll 24 thus swings out to an extreme open position 39 (broken outline) thus permitting the cant to pass between the roll and the line bar. The position 39 is held for a fraction of a second, the cylinder 33 then swinging the roll inwards to contact a side face of the cant opposite to the cant datum face, forcing the cant datum face against the line bar working face 18, thus holding the cant steady whilst it is being cut by the saw. The distance the roll moves inwards from the position 39 is determined by unsawn width of the cant and force urging the cant against the line bar is determined by force from the cylinder 33. When the cant has passed the roll, the arm swings inwards to the closed position, thus being primed for a following cant.

The crowder roll pair assembly 16 has a second crowder roll arm 45 similar to the arm 21. The arm 45 has a trigger plate 46 and is swung by a pneumatic cylinder 47. A roll 48, at an outer end of the arm 45 is synchronized to rotate at the same speed as the roll 24. The arms swing independently, being operated by respective trigger plates and cylinders.

Alternatively, the arms can be adapted to swing simultaneously in parallel motion, being synchronized by a synchronizing chain 50 (shown in broken outline in FIG. 3 only). The chain interconnects the vertical columns of the arms and when one arm swings away from a stationary arm, the moving arm pulls the stationary arm with it. In such an alternative the trigger plate 38 on the arm 21 is eliminated, or disconnected, as it is redundant. But synchronized arms are limited in use, and in some applications, independent movement of the crowder roll arms is best, because when synchronized arms are used, difficulties can arise when a narrow cant is followed closely by a wide cant, as explained in the following. When a trailing end of the narrow cant leaves the crowder roll arm 45, a closely following leading end of a wide cant triggers the arm 45 and moves it to a wider position. The synchronizing chain pulls the arm 21 to a more open position, releasing the roll 24 from the trailing end of the narrow cant which, at that instant, is being sawn. Thus the trailing end of the narrow cant is no longer held against the line bar by the arm 21 and is thus free to chatter on the line bar before sawing is completed, lowering cut quality. The disadvantages described above are associated with a rapid change in unsawn cant widths, and thus use of the synchronizing chain with closely spaced cants of nonuniform widths may produce chatter.

The frame 15 carries a horizontal roll case 53 having a plurality of knurled rolls 55 providing the upper face for the infeed conveyor 10 to carry cants, the rolls being powered by means not shown so as to feed the cants in a direction of the arrow 11. A similar powered roll 56 is provided in a portion of an outfeed conveyor 57.

With reference to FIG. 3 only, the line bar 17 has free-wheeling roll pairs 58 and 59 cooperating with the crowder rolls 48 and 24 respectively. The roll pair 59 has free-wheeling rolls 61 and 62 (broken outline)

journalled for rotation on vertical axis and spaced so as to straddle the roll 24 when the roll 24 is adjacent the working surface 18 of the line bar 17. The freewheeling rolls 61 and 62 stand proud of the working face 18 of the line bar a distance sufficient to relieve pressure of the cants from the line bar, usually about a quarter of an inch. The line bar has sufficient rigidity to withstand, without material deflection, force of the two crowder roll arms forcing cants against the working face. The line bar is set up and aligned accurately using optical method so as to reduce errors. Setting of the bandmills independently changes sawn cant width whilst the line bar remains stationary throughout.

FIG. 5

The arm 21 is shown diagrammatically in full outline in a minimum cant width position, the roll 24 shown in contact with an outer face 71 (broken outline) of a cant of minimum width 72, forcing the cant against the working face 18. Initially, when the arm 21 is in the closed position (FIG. 3) and the plate 38 is triggered by a cant, the arm 21 rotates outwards in the direction of the arrow 44 to move the roll to the extreme open position 39 (broken outline) to pass the leading end of the cant, and then the arm swings inwards to meet the outer face of the cant. For a cant of maximum width, the arm 21 moves the roll from the position 39 to a maximum cant width position 73 (broken outline) in which position the roll engages an outer face 74 (broken outline) of a cant of maximum width 75. Thus rotation of the arm permits the roll 24 to assume any position on an arc 70 to accommodate a cant having an unsawn width between minimum and maximum.

A horizontal section through the saw cutting plane 76 has a leading portion having teeth 77, and spacing 79 of the cutting plane from the working face 18 determines sawn cant width, ignoring kerf loss. When the roll 24 is forced against the cant of minimum width, a vertical contact strip 80 between the roll and the cant is longitudinally separated from the teeth 77 of the saw by a distance 81, termed overhang length. When the roll is in the maximum width cant position 73, corresponding overhang length is designated 83, being somewhat greater than the length 81. Thus, as shown, overhang length for a cant of minimum width, that has inherently greater flexibility than a wider cant, other factors being equal, is less than overhang length for a maximum width cant. This is in contrast to conditions relating to a cant of minimum width when it is being sawn in a prior art bandmill, as described with reference to FIG. 6.

The axis 30 is spaced a distance 84 from the working face of the line bar, which distance can be adjustable for particular requirements dependant on a normal range of cant widths that are to be handled by the bandmill, and also disposition of bandmills if used with a twin bandmill. As shown in FIGS. 3 and 5, the distance 84 is about one half of maximum cant width which results in the arm 21 swinging through the arc 70, outer limits of which are disposed unsymmetrically about a centreline 85 of the conveyor. That is, an angle 86 subtended at the axis 30 by the roll in the maximum width position 73 is greater than an angle 87 subtended at the axis 30 when the roll is in the minimum width position. This is a usual arrangement where most of the cants to be resawn have a width considerably less than maximum width that the conveyor can handle. For optimum support of cants of minimum width the angle 87 would be zero but such an arrangement would not produce optimum support conditions for most of the cants to be resawn which would have a width greater than minimum. If most of the cants to be resawn have a width approaching the maximum cant width, the distance 84 is increased so that the angles 86 and 87 tend to equal each other.

Parameters which determine the distance 84 include minimum and maximum cant widths, normal cant width to be handled and diameter of the roll 24. The position of the hinge axis 30 is not critical as the arc 70 is relatively flat and differences between minimum and maximum overhang lengths is generally two or three inches dependent on size of conveyor. By providing a range of adjustment of the distance 84, clearance can be obtained for twin bandmill arrangements in which, in some positions, there might otherwise be a risk of interference between the roll and a saw.

FIG. 6 (Prior Art)

A prior art crowder roll arm 90, hinged at 91, has a roll 92 shown in full outline in contact with an outer face 93 (broken outline) of a cant of minimum width 95.

To accommodate a cant of maximum width, the roll 92 swings through an arc 97 (broken outline) to an extreme open position 98 (broken outline), then swings inwards to a maximum cant width position 99 (broken outline) with the roller bearing against an outer face 101 of a cant having a maximum width 102.

A horizontal section through a saw cutting plane is designated 104, the saw having teeth 105 at a leading edge. A vertical contact strip 106 between the roll 92 and the cant of minimum width is longitudinally spaced from the saw teeth 105 by a distance 107, termed prior art overhang length. When the roll 92 contacts an outer face of the cant of maximum width, corresponding overhang length is 109, which is less than the length 107. Thus, in prior art crowder roll assemblies, overhang length for a cant of minimum width is greater than overhang length for a cant of maximum width, difference in overhang lengths being about 5 or 6 inches depending on conveyor size. Thus, in prior art assemblies, both increased flexibility of narrow cants and increased overhang length contribute to increased risk of chatter, with corresponding reduction in cut quality.

Thus, summarizing, overhang length in the crowder roll assembly of FIG. 5 decreases as cant width decreases, whereas in the prior art crowder roll assemblies of FIG. 6 the overhang length increases as cant width decreases.

OPERATION

With reference to FIGS. 3 and 5, a cant (not shown) to be sawn by the bandmill 12, is carried on the roll case 53 and fed by the knurled rolls 55 in the direction of the arrow 11. Before the leading edge of the cant contacts the trigger plate 46 of the arm 45, the arm 45 is in the closed position as shown in FIG. 3. When the cant contacts the arm, the arm swings outwards to the extreme open position (for the arm 21, the position 39) which it holds instantaneously before swinging inwards until the roll 48 contacts the outer face of the cant. The arm 45 thus forces the sawn datum face of the cant against the working face 18 of the line bar, maintaining axial translation of the cant, the roll 48 augmenting feed through the saw. The leading edge of the cant then contacts the trigger plate 38 of the arm 21, which arm follows a motion similar to the arm 45, resulting in both rolls 48 and 24 pressing the cant against the working face 18 and feeding the cant through the saw. The cant is then cut as it passes through the saw cutting plane, producing a sawn cant having a sawn width dependent on spacing between the working face and the saw cutting plane. The sawn lumber so produced passes from the bandmill on the outfeed conveyor 57. As the trailing end of the cant leaves the roll 48, the arm 45 moves inwards to the closed position, leaving the arm 21 to maintain the trailing end of the cant against the line bar substantially until cutting is finished. A next cant following on the infeed conveyor contacts the trigger plate, swinging the arm 45 outwards to the extreme open position as before, and then inwards to contact the outer face of the next cant. A similar procedure as before is then repeated for the arm 21.

The above describes operation without the synychronizing chain 50. If a synchronizing chain is fitted, rotation of the arm 45 outwards in direction of the arrow 44 also swings the arm 21 outwards. Either arm follows the other so long as there is tension in the chain 50. As stated before, use of the synchronizing chain is limited and has disadvantages.

To change sawn cant width, one or both of the bandmills is moved relative to the line bar, the line bar remaining stationary throughout.

ALTERNATIVES AND EQUIVALENTS

In FIGS. 1 through 3 the infeed conveyor is shown with two similar crowder roll arms 21 and 45. The advantage of reducing overhang length with reduction in unsawn cant width as described above can be attained by using one crowder roll arm according to the invention adjacent the bandmill in a position similar to the arm 21, and one prior art crowder roll arm 90 according to FIG. 6, disposed upstream relative to the conveyor in a position similar to the arm 45. With such an arrangement (not illustrated) each crowder roll arm is individually actuated and the synchronizing chain is eliminated.

The cylinders 33 and 47 serve as means to rotate the arms 21 and 45 about the hinge axes so as to accommodate cants of different widths. Clearly other means can be substituted.

I claim:

1. A crowder roll assembly for use with an infeed conveyor of a bandmill, the bandmill having an endless saw running on a pair of spaced coplanar wheels, the saw being adapted to cut a cant when the cant is fed through a saw cutting plane, the cant having a sawn datum face and being fed longitudinally on an upper face of the infeed conveyor toward the saw, a line bar having a working face in a plane parallel to and spaced from the saw cutting plane, such spacing determining sawn cant width, the crowder roll assembly including:
    a. an arm having at one end a roll adapted to contact the cant and force the sawn datum face thereof against the line bar, a contact strip between the roll and the cant being longitudinally separated from teeth of the saw by an overhang length; an opposite end of the arm being hinged so as to permit rotation of the arm to accommodate cants of different widths, constructed and arranged so that overhang length for a cant of minimum width is less than overhang length for a cant of maximum width, so as to reduce chatter and improve cut quality when cutting narrow cants.

2. A crowder roll assembly as defined in claim 1 in which:
    b. the hinge at the opposite end of the arm has an axis in a plane parallel to the working face of the line bar and passing normally through the infeed conveyor constructed and arranged so that, when the arm swings about the hinge axis, an arc described by the roll is in a plane parallel to the upper face of the conveyor.

3. A crowder roll assembly as claimed in claim 2 in which:
    c. the hinge axis of the arm is spaced a distance from the working face of the line bar of approximately one half of maximum cant width.

4. A crowder roll assembly as claimed in claim 1 in which:
    d. the line bar is fixed and the bandmill sets to the line bar to change sawn cant width.

5. A crowder roll assembly as defined in claim 1 in which the arm has:
    e. an upper portion having inner and outer ends, the outer end of the upper portion being the end of the arm having the roll,
    f. a lower portion having inner and outer ends, the lower portion being spaced from the upper portion a distance sufficient to pass a cant of maximum depth on the infeed conveyor, the outer end of the lower portion being the opposite end of the arm that is hinged for rotation,
    g. a column secured to the inner ends of the upper and lower portions to carry the portions in spaced relationship; and the arm is hinged on
    h. a pin journalled in brackets provided beneath the infeed conveyor; constructed and arranged so that the infeed conveyor is straddled by the upper and lower portions of the arm, and clearance exists between the conveyor and the upper portion to accept a cant of maximum depth on the conveyor.

6. A crowder roll assembly as defined in claim 5 in which:
    i. the upper portion is coplanar with a first vertical plane containing the column,
    j. the lower portion is coplanar with a second vertical plane intersecting the first vertical plane at the column, constructed and arranged so that, when the arm is primed in the closed position, a cant moving on the conveyor passes through the second vertical plane before passing through first vertical plane, the first vertical plane being at an acute angle to direction of travel of the cant.

7. A crowder roll assembly as defined in claim 6, in which the vertical planes intersect at an acute angle.

8. A crowder roll assembly as defined in claim 5 including:
    k. means to rotate the arm about the hinge axis so as to accommodate cants of different widths.

9. A crowder roll assembly as claimed in claim 8 in which the means to rotate the arm includes:
    1. an extensible cylinder extending between the arm and a portion of conveyor, adapted so that extension and retraction of the cylinder rotates the arm about the hinge axis.

10. A crowder roll assembly as defined in claim 6 including:

m. a trigger plate mounted on a leading face of the upper portion and adapted to be contacted by a leading end of the cant, the plate being operatively connected to the means to rotate the arm, constructed and arranged so that when a cant moving on the conveyor towards the saw contacts the trigger plate, the arm swings outwards permitting the cant to pass, then swings inwards to force the cant against the line bar.

* * * * *